United States Patent
Ferri et al.

[15] 3,635,658
[45] Jan. 18, 1972

[54] RARE EARTH OXIDE PROCESS

[72] Inventors: John L. Ferri, Towanda; James E. Mathers, Ulster, both of Pa.

[73] Assignee: Sylvania Electric Products, Inc.

[22] Filed: Apr. 2, 1969

[21] Appl. No.: 812,913

[52] U.S. Cl. .................................23/19 R, 23/23, 23/183, 260/429.2
[51] Int. Cl. .........................................................C22b 59/00
[58] Field of Search ....................23/19, 23, 183; 260/429.2

[56] References Cited

UNITED STATES PATENTS 3,420,861  1/1969  Ropp et al. ..........................260/429.2

OTHER PUBLICATIONS

Alimarin et al., article in " Rare-Earth Elements," Academy of Sciences, U.S.S.R., Moscow, 1959, pp. 177– 189.

Glasner et al., " Chemist-Analyst," Vol. 48, 1959, pp. 37– 38.

Primary Examiner—Herbert T. Carter
Attorney—Norman J. O'Malley, Donald R. Castle and William H. McNeill

[57] ABSTRACT

A process for increasing the particle size of rare earth oxides is disclosed comprising: forming an aqueous mineral acid solution containing a rare earth source dissolved therein, reacting the rare earths in said solution with oxalic acid to form an insoluble rare earth oxalate, separating the rare earth oxalate from the reaction medium, contacting the rare earth oxalate with an aqueous oxalic acid solution having a concentration of oxalic acid of from about 1 to about 40 percent by weight and heating the rare earth oxalate to a sufficient temperature and time to convert said rare earth oxalates into rare earth oxides having a particle size of at least 3 microns.

8 Claims, No Drawings

RARE EARTH OXIDE PROCESS

BACKGROUND OF THE INVENTION

This invention relates to rare earth oxides. More particularly it relates to a process for producing rare earth oxides wherein the particle size of the rare earth oxides is controlled.

Rare earth oxides, such as lanthanum oxide, yttrium oxide, gadolinium oxide and the mixed crystal yttrium-gadolinium oxide when activated by certain other rare earth ions such as europium, terbium and the like, are extremely bright phosphors which may be used in color cathode-ray tubes, for example. When produced by conventional techniques, that is by precipitating an insoluble rare earth salt, such as the rare earth oxalates, that can be converted to the oxide upon the application of heat, the phosphors have a large portion of their particles below 2 microns. Because of the small particle size, it is necessary to use the "slurry technique" for forming a color cathode-ray tube screen. In this technique the phosphors are mixed with a photosensitive material and deposited upon a panel, which forms the support for the screen in form of a slurry. It has been discovered that during the slurry process the phosphors lose some of their brightness probably because the chemical sensitizer used in the photosensitive material reacts with the phosphor.

An additional method of applying phosphors to viewing panels is well known and described in U.S. Pat. No. 3,025,161. This method overcomes the problem of the dulling of the brightness of the phosphors, however, some cross contamination between the red-, green- and blue-emitting phosphors occurs when the phosphors have a large portion of the particles below 2 microns. The before-mentioned dry deposition technique can be used satisfactorily with phosphors having an average particle size of from about 3 to about 30 microns.

As a result of the foregoing problems in applying the rare earth oxide phosphors, although their colors are brighter than any of the other known phosphors, these materials have not had wide acceptance in the color television industry. Furthermore, rare earth oxides having larger particle sizes may be advantageously employed in other industries using rare earth oxides such as the manufacture of certain glasses, ceramics, catalysts, arc carbon and the like. A process for producing a rare earth oxide having a large enough particle size to enable the phosphors produced from them to be used in additional processes thereby enabling the rare earth oxide phosphors to be used in color television without an appreciable loss of brightness would be an advancement in the art.

CROSS-REFERENCES TO RELATED APPLICATIONS

OUr copending Pat. application Ser. No. 812,825, filed concurrently herewith, discloses and claims a certain limited class rare earth oxide phosphors that can be produced from the oxides produced by the process of this invention.

SUMMARY OF THE INVENTION

In accordance with one aspect of the present invention, there is provided a process useful for increasing the particle size of rare earth oxides. The process comprises (a) forming an aqueous mineral acid solution containing dissolved therein a rare earth source; (b) reacting the rare earths in the solution with oxalic acid to form insoluble rare earth oxalates; (c) separating the rare earth oxalates from the solution; (d) contacting the rare earth oxalates with an aqueous oxalic acid solution having an oxalic acid concentration of from about 1 to about 40 percent by weight and thereafter (e) heating the rare earth oxalate to a sufficient temperature and for a sufficient time to convert the rare earth oxalates to rare earth oxides having an average particle size of at least about 3 microns and preferably of at least about 5 microns.

For a better understanding of the present invention, together with other and further objects, advantages and capabilities thereof, reference is made to the following disclosure and appended claims in connection with the above description of some of the aspects of the present invention.

DESCRIPTION OF THE PREFERRED EMBODIMENTS

The particle size of the rare earth oxide can be increased by the practice of this invention. It is to be noted that within the context of this invention yttrium is considered as a rare earth since it behaves in a similar manner to other rare earths such as gadolinium and lanthanum. In general, any rare earth oxide can receive the benefits of the present invention. Especially the rare earth oxides wherein the rare earths are selected from the group consisting of europium, terbium, samarium, yttrium, gadolinium, lanthanum or mixtures thereof. It is also to be noted that the article size of certain rare earth phosphors that use the rare earth oxides as raw materials, such as the rare earth oxysulfides, can be increased by employing the larger oxides produced herein.

As is known in the art, the rare earth oxide phosphors are activated by other rare earth ions to give an emission of a particular color when subjected to excitation, such as by cathode rays. For example, europium- and samarium-activated rare earth oxides emit a very bright red. Terbium-activated rare earth oxide phosphors emit in the green. Generally, such activators are used in amounts of from about 0.001 moles to about 0.2 moles of activator per mole of rare earth oxide. Other ions in relatively minor amounts, such as bismuth, cerium, lutetium, calcium, strontium and the like can be incorporated in the phosphor to modify various properties of the phosphor e.g., to control brightness, cause a color shift, to effect decay characteristics and the like. The benefits of the present invention are achieved when phosphors containing these additives are prepared from the oxides produced by this process. These additives when used in the phosphors are generally employed in amounts of less than about 0.01 moles/mole of phosphor.

In the practice of this invention it is necessary to have the rare earth dissolved in an aqueous solution of a mineral acid such as nitric or hydrochloric acid. Although the concentration of the mineral acid in the aqueous solution can vary, it is generally preferred to use relatively concentrated acids, that is above about 50 percent by weight. After the acidic solution containing the dissolved rare earths is prepared, the rare earths are reacted with oxalic acid. Although the order of addition is not considered to be critical, it is preferred to add the oxalic acid to the mineral acid, rare earth solution. In most instances a relatively warm, relatively concentrated aqueous oxalic acid solution will be added to the solution containing the rare earths. The precipitation of the rare earth oxalates is quite rapid, therefore, the determination of a sufficient amount of oxalic acid is readily ascertainable. The oxalic acid solution is added until no more precipitation of the oxalates occurs. Excellent results are achieved when a 20 percent oxalic acid solution is used and is added to a solution containing a rare earth concentration of from about 10 percent to about 25 percent by weight of rare earths.

The rare earth oxalates can be removed from the acidic mother liquor by any conventional liquid-solid separation such as filtration, centrifugation, decantation and the like. Filtration is generally the preferred method of separation. After the solids are separated, the rare earth oxalates are contacted with oxalic acid solution having an oxalic acid concentration of from about 1 to about 40 percent by weight. The concentration of the oxalic acid solution does not appreciably effect the particle size of the oxide that is subsequently produced. The contact of the oxalic acid is sufficient if a filter cake is washed in a normal manner with the oxalic acid solution.

After the material is contacted by the oxalic acid solution it is dried to remove essentially all of the free water. Heating the oxalates in an oven at a temperature 110° C. is sufficient. After drying, the oxalates are heated to above about 830° C. for a time sufficient to convert essentially all of the rare earth oxalates to the rare earth oxides. If a phosphor is desired it generally is necessary to elevate the temperature above about 1,100° C. to convert the oxide to the phosphor. The higher temperature does not effect the particle size of the material.

If desired, however, the rare earth oxide can be converted to other phosphors such as yttrium oxysulfide relatively easily by methods known in the art, and without a change in particle size.

To more fully illustrate this invention, the following non-limiting examples are presented. All parts, proportions and percentages are by weight unless otherwise indicated.

EXAMPLE I

Europium-activated yttrium oxide having the composition $(Y_{0.955}Eu_{0.452}O_3$ is prepared by dissolving about 215.6 parts of $Y_2O_3$ (99.999 percent purity) and about 15.8364 parts of $Eu_2O_3$ (99.999 percent purity) in about 928 parts of a 1:1 nitric acid solution. The rare earth nitrate solution is then filtered. A hot 20 percent oxalic acid solution is slowly added to the nitrate filtrate until no further oxalate precipitation is observed. The rare earth oxalates are then filtered and washed with 1,000 parts of a 20 percent oxalic acid solution. The washed oxalate material is then dried at about 110° C. The dried oxalates are then fired in a furnace, at about 1,260° C. for 6 hours. The cooled, fired material is then sieved through a 400-mesh screen to remove the oversize fraction. The resultant particles average about 8 microns in diameter as measured by a Fisher subsieve sizer.

For purpose of comparison, the cathodoluminescent intensity of the phosphor made by this method is compared with that prepared by the prior art process from water washed oxalates of yttrium and europium. Phosphors prepared using the $H_2O$ washed material have a large population of fines and an average particle diameter of about 2.5 microns.

Cathodoluminescent intensity for the phosphor made by the oxalic acid wash method is equal to that of a control material prepared without the oxalic acid washing of the mixed oxalates.

EXAMPLE II.

Using essentially the same procedure as in example I except that the precipitated oxalates are given a 5 percent oxalic acid solution wash, it is found that the resultant phosphor particles have an average diameter of about 4.5 microns as measured by Fisher subsieve size and about 7.5 microns by the Coulter counter technique.

EXAMPLE III

A mixed crystal europium-activated yttrium-gadolinium oxide is prepared in a manner essentially as described in example I, except that an oxalic acid wash solution containing 30 percent oxalic acid is used and a firing temperature of 1,232° C. is employed. The resultant phosphor particles averages about 5 to 6 microns by F.S.S.S. The luminescent properties of this material are about the same as the unfluxed control.

EXAMPLE IV

Example III is repeated except that the coprecipitated yttrium-gadolinium-europium oxalates are washed with a 10 percent oxalic acid solution. Cathodoluminescent properties are similar to those obtained for the phosphor of example III. The particle size of the phosphor is about 4 microns by F.S.S.S. and about 7.5 microns by the Coulter counter.

Substantially similar results are achieved when terbium and samarium are substituted for europium in the above example.

EXAMPLE V

Gadolinium oxide is prepared in accordance with example I, except that a 20 percent oxalic acid wash solution is employed and the firing temperature is about 800° C. The resultant oxide particle size is about 3 microns by F.S.S.S. and about 7 microns by Coulter counter. Substantially similar results are achieved when lanthanum is substituted for gadolinium in equivalent amounts.

EXAMPLE VI

Example V is repeated, except that a saturated solution of oxalic acid at 80° C. is used as a wash. The resultant phosphor particles are about 5–6 microns by F.S.S.S. and the luminescent properties are about the same as a control prepared with water washes.

EXAMPLE VII

A phosphor essentially the same as that prepared in example I is made by following essentially the same procedure except that hydrochloric acid is substituted for the nitric acid in example I on a substantially equal stoichiometric basis. Additionally it has been found that in some instances minor amounts of a mineral acid such as nitric or hydrochloric acid can be added to the oxalic acid wash. In such instances the amount of the mineral acid is at most about 10 percent by weight of the oxalic acid.

While there have been shown and described what is at present considered the preferred embodiments of the invention, it will be obvious to those skilled in the art that various changes and modifications may be made therein without departing from the scope of the invention as defined by the appended claims.

We claim:

1. A process for increasing the particle size of a rare earth oxide, said process comprising:
    a. forming an aqueous mineral acid solution by dissolving a rare earth source in a mineral acid selected from the group consisting of nitric acid and hydrochloric acid;
    b. reacting the rare earth in said solution with oxalic acid to form an insoluble rare earth oxalate;
    c. separating said rare earth oxalate from the reaction medium;
    d. washing said rare earth oxalate with an oxalic acid solution having an oxalic acid concentration of from 5 to about 40 percent by weight, and thereafter
    e. heating the rare earth oxalate to a sufficient temperature and for a sufficient time to convert said rare earth oxalate to a rare earth oxide having an average particle size of at least about 3 microns.

2. A process according to claim 1 wherein said rare earth is selected from the group consisting of lanthanum, samarium, europium, terbium, yttrium and gadolinium and mixtures thereof.

3. A process according to claim 2 wherein said oxide is gadolinium oxide.

4. A process according to claim 2 wherein said oxide is yttrium oxide.

5. A process according to claim 2 wherein said oxide is mixed crystal yttrium-gadolinium oxide.

6. A process according to claim 2 wherein said oxide contains europium and is suitable for conversion to a europium-activated rare earth oxide phosphor.

7. A process according to claim 2 wherein said oxalic acid concentration is from about 5 percent by weight to about 30 percent by weight.

8. A process according to claim 7 wherein said particle size is above about 5 microns.

* * * * *